US011327336B2

(12) United States Patent
Gao et al.

(10) Patent No.: US 11,327,336 B2
(45) Date of Patent: May 10, 2022

(54) PANEL WITH VIRTUAL CURVED DISPLAY SURFACE AND DISPLAY DEVICE (71) Applicant: BOE TECHNOLOGY GROUP CO., LTD., Beijing (CN)

(72) Inventors: Jian Gao, Beijing (CN); Xiaochuan Chen, Beijing (CN); Yafeng Yang, Beijing (CN); Wei Wang, Beijing (CN); Chen Yu Chen, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 652 days.

(21) Appl. No.: 16/302,026

(22) PCT Filed: Mar. 2, 2018

(86) PCT No.: PCT/CN2018/077913
§ 371 (c)(1),
(2) Date: Nov. 15, 2018

(87) PCT Pub. No.: WO2018/166363
PCT Pub. Date: Sep. 20, 2018

(65) Prior Publication Data
US 2019/0155044 A1 May 23, 2019

(30) Foreign Application Priority Data

Mar. 17, 2017 (CN) .............................. 201710162116

(51) Int. Cl.
*G02B 30/00* (2020.01)
*G02B 30/27* (2020.01)
(Continued)

(52) U.S. Cl.
CPC ............. *G02B 30/27* (2020.01); *G02B 30/26* (2020.01); *G02B 30/30* (2020.01); *G02B 30/32* (2020.01);
(Continued)

(58) Field of Classification Search
CPC ........ G02B 30/26; G02B 30/27; G02B 30/30; G02B 30/32; G02B 30/40; G02B 27/0172;
(Continued)

(56) References Cited

U.S. PATENT DOCUMENTS

2013/0155505 A1* 6/2013 Kim ..................... H04N 13/337
359/465
2015/0138486 A1 5/2015 Lee
(Continued)

FOREIGN PATENT DOCUMENTS

CN 104575322 A 4/2015
CN 105572930 A 5/2016
(Continued)

OTHER PUBLICATIONS

International Search Report and Written opinion dated May 30, 2018, from application No. PCT/US2018/077913.

*Primary Examiner* — Jade R Chwasz
*Assistant Examiner* — Jyotsna V Dabbi
(74) *Attorney, Agent, or Firm* — Thomas | Horstemeyer, LLP (57) ABSTRACT A panel with a virtual curved display surface and a display device are provided. The virtual curved display panel includes a display panel and a grating. The grating is disposed at a light-exiting side of the display panel, and includes a plurality of light-transmitting regions and a plurality of light-shielding regions spaced apart from each other. Respective widths of the plurality of light-shielding regions of the grating are gradually decreased as respective distances from the plurality of light-shielding regions to a symmetry axis of the display panel are increased, and respective widths of the plurality of light-transmitting regions are gradually increased as respective distances from (Continued)

the plurality of light-transmitting regions to the symmetry axis of the display panel are increased.

10 Claims, 10 Drawing Sheets

(51) Int. Cl.
*G02B 30/40* (2020.01)
*G02B 30/30* (2020.01)
*H04N 13/31* (2018.01)
*H04N 13/225* (2018.01)
*G02B 30/26* (2020.01)
*G02B 30/32* (2020.01)
*H04N 13/302* (2018.01)

(52) U.S. Cl.
CPC ........... *G02B 30/40* (2020.01); *H04N 13/225* (2018.05); *H04N 13/31* (2018.05); *H04N 13/302* (2018.05)

(58) Field of Classification Search
CPC ........... G02B 2027/0123; H04N 13/31; H04N 13/302; H04N 13/225; G09F 9/301
USPC .... 359/462–464, 466, 475, 478; 348/42–60; 353/7–9; 349/8–9, 15
See application file for complete search history.

(56) References Cited

U.S. PATENT DOCUMENTS

| | | | |
|---|---|---|---|
| 2016/0100119 A1* | 4/2016 | Lee | H04N 13/398 348/571 |
| 2016/0133169 A1* | 5/2016 | Park | G09G 3/00 345/6 |
| 2016/0187745 A1 | 6/2016 | Jin | |
| 2017/0262961 A1* | 9/2017 | Ekambaram | G09G 5/346 |
| 2018/0059427 A1 | 3/2018 | Yin et al. | |
| 2018/0113370 A1 | 4/2018 | Zhao et al. | |

FOREIGN PATENT DOCUMENTS

| | | |
|---|---|---|
| CN | 105700269 A | 6/2016 |
| CN | 105842908 A | 8/2016 |
| CN | 105929587 A | 9/2016 |
| CN | 106054298 A | 10/2016 |
| CN | 106772737 A | 5/2017 |
| CN | 107067980 A | 8/2017 |
| KR | 20150057743 A | 5/2015 |
| KR | 101753446 B1 | 7/2017 |
| WO | WO-2017/177671 A1 | 10/2017 |
| WO | WO-2017/215396 A1 | 12/2017 |
| WO | WO-2017/219760 A1 | 12/2017 |

* cited by examiner

PANEL WITH VIRTUAL CURVED DISPLAY SURFACE AND DISPLAY DEVICE

CROSS-REFERENCE TO RELATED APPLICATIONS

The present application is based upon International Application No. PCT/CN2018/077913, filed on Mar. 2, 2018, which claims priority to Chinese Patent Application No. 201710162116.9, titled "PANEL WITH VIRTUAL CURVED DISPLAY SURFACE AND DISPLAY DEVICE", filed on Mar. 17, 2017, and the entire contents thereof are incorporated herein by reference as a part of the present application.

TECHNICAL FIELD

The present disclosure relates to the field of display technology, and in particular, to a panel with a virtual curved display surface and a display device.

BACKGROUND

The surrounding effect of a curved surface display may enhance the visual impact of a user when watching, but the existing curved display panel has advantages such as difficult physical bending process and heavy device.

The traditional flat display panel has the advantage of saving physical space and is therefore widely used. However, due to the light distribution property of the flat panel display, generally, when a user watches the flat panel display, the symmetry axis of the flat panel display approximately faces the human eyes, and, which brings bad experience to the viewing of the human eyes. Especially for large flat panel displays, this effect is more obvious.

It should be noted that the information disclosed in the background section above is only for enhancing the understanding of the background of the present disclosure, and thus may include information that does not constitute prior art known to those ordinary skilled in the art.

SUMMARY

According to an aspect of the present disclosure, there is provided a panel with a virtual curved display surface, including a display panel and a grating. The grating is disposed at a light-exiting side of the display panel, and includes a plurality of light-transmitting regions and a plurality of light-shielding regions spaced apart from each other. Respective widths of the plurality of light-shielding regions of the grating are gradually decreased as respective distances from the plurality of light-shielding regions to a symmetry axis of the display panel are increased, and respective widths of the plurality of light-transmitting regions are gradually increased as respective distances from the plurality of light-transmitting regions to the symmetry axis of the display panel are increased.

In an exemplary arrangement of the present disclosure, light emitted from the display panel forms a virtual curved surface through the grating. The virtual and curved surface is formed at an opposite side of the display panel to the light-exiting side.

In an exemplary arrangement of the present disclosure, a calculation formula of the width of each of the light-shielding regions is:

$$w = \frac{x+h}{x+L}D,$$

and
a calculation formula of the width of each of the light-transmitting regions is:

$$s = \frac{2(L-h)p}{L} - w.$$

In the above formulas, x is a distance between the virtual curved surface and the display panel; w is the width of the light-shielding region; h is a distance between the grating and the display panel; D is an interval between pupils of left and right eyes of a user; L is a distance from the left and right eyes of the user to the display panel; s is the width of the light-transmitting region; and p is a width of a sub-pixel or pixel of the display panel.

In an exemplary arrangement of the present disclosure, both ends of the virtual curved surface intersect with the display panel.

In an exemplary arrangement of the present disclosure, both ends of the virtual curved surface do not intersect with the display panel.

In an exemplary arrangement of the present disclosure, light emitted from the display panel forms a virtual curved surface through the grating. The virtual curved surface is formed at the light-exiting side of the display panel.

In an exemplary arrangement of the present disclosure, a calculation formula of the width of each of the light-transmitting regions is:

$$s = \frac{x-h}{L-x}D,$$

and
a calculation formula of the width of each of the light-shielding regions is:

$$w = \frac{2(L-h)p}{L} - s.$$

In the above formulas, x is a distance between the virtual curved surface and the display panel; w is the width of the light-shielding region; h is a distance between the grating and the display panel; D is an interval between pupils of left and right eyes of a user; L is a distance from the left and right eyes of the user to the display panel; s is the width of the light-transmitting region; and p is a width of a sub-pixel or pixel of the display panel.

In an exemplary arrangement of the present disclosure, the virtual curved surface is tangent to the display panel.

In an exemplary arrangement of the present disclosure, the light emitted from the display panel forms a virtual curved surface through the grating. A part of the virtual curved surface is located at the light-exiting side of the display panel, and another portion of the virtual curved surface is located at an opposite side of the display panel to the light-exiting side.

According to an aspect of the present disclosure, there is provided a display device, including any one of the above the panels with a virtual curved display surface.

It should be understood that the above general description and the following detailed description are merely exemplary and explanatory, and are not limiting of the present disclosure.

BRIEF DESCRIPTION OF THE DRAWINGS

The drawings herein, incorporated into the specification and forming part of the specification, show arrangements of the present disclosure and explain the principle of the present disclosure together with the specification. It is apparent that the drawings in the following description are only some of the arrangements of the present disclosure, and other drawings may be obtained according to these drawings by those skilled in the art without creative labor.

DETAILED DESCRIPTION

Example arrangements will now be described more fully with reference to the drawings. However, the example arrangements can be embodied in various forms and should not be construed as being limited to the examples set forth herein; the described features, structures, or characteristics may be combined in any suitable manner in one or more arrangements. In the following description, numerous specific details are set forth to provide a full understanding of the arrangements of the present disclosure. However, one skilled in the art will appreciate that the technical solutions of the present disclosure can be practiced when one or more of the described specific details are omitted or by other methods, components, devices, blocks, etc.

It is necessary to point out that in the drawings, the dimensions of layers and regions may be exaggerated for clarity of illustration. It is also understood that when an element or layer is referred to as "on" another element or layer, it may be directly on the other element or the intermediate layer may be present. In addition, it can be understood that when an element or layer is referred to as being "under" another element or layer, it may be directly under the other element or there may be one or more intermediate layers or elements. In addition, it can also be understood that when a layer or element is referred to as being "between" two layers or elements, it can be the only layer between the two layers or elements, or one or more intermediate layers or components may be present. Similar reference numerals indicate similar components throughout.

Figure 1:
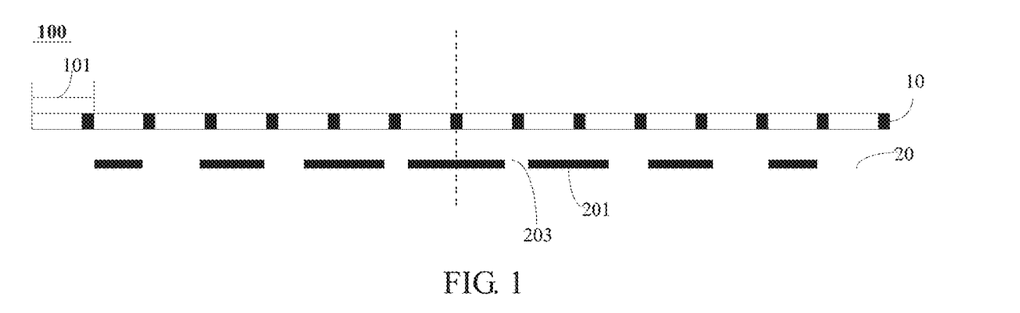
FIG. 1 shows a schematic diagram of a first panel with a virtual curved display surface in an exemplary arrangement of the present disclosure.

FIG. 1 shows a schematic diagram of a first panel with a virtual curved display surface in an exemplary arrangement of the present disclosure.

As shown in FIG. 1, the panel with virtual curved display surface 100 may include a display panel 10 and a grating 20.

In an exemplary arrangement, the display panel 10 may be a flat display panel, for example, the display panel 10 may be any flat display panel such as an LCD or an OLED, which is not limited in the present disclosure.

In an exemplary arrangement, the display panel 10 may include a plurality of sub-pixels 101 (e.g., red sub-pixels, green sub-pixels, blue sub-pixels, etc.) or a plurality of pixels 101 (e.g., one pixel may further include a plurality of sub-pixels). The principle of the arrangement of the present disclosure is: using the binocular parallax principle, the depth perception of both eyes is generated. Specifically, the light-shielding principle of the grating is used to make the light emitted from two adjacent sub-pixels (for example, R red sub-pixel and R red sub-pixel) or two adjacent pixels respectively enter the left eye and the right eye of human eyes, and images generated by the adjacent sub-pixels or pixels for the depth perceptions of both eyes arrange in a curved surface, so that a virtual curved surface display effect is generated for the both eyes, enhancing the visual effect impact of the viewing.

The grating 20 may be disposed on a light exiting side of the display panel 10.

With continued reference to FIG. 1, the grating 20 may include a plurality of light-transmitting regions 203 and a plurality of light-shielding region 201 that are spaced apart from each other.

In the arrangement shown in FIG. 1, the widths of the respective light-transmitting regions 203 and that of the respective light-shielding regions 201 are unequal.

In an exemplary arrangement, the respective light-shielding regions 201 of the grating 20 have widths which are gradually decreased as distances from the light-shielding regions 201 to a symmetry axis of the display panel 10 are increased, that is, the width of the light-shielding region 201 in the middle is large, and the widths of the light-shielding regions 201 at both sides are small. The respective light-transmitting regions 203 have widths which are gradually increased as distances from the light-transmitting regions 203 to the symmetry axis of the display panel 10 are increased, that is, the width of the light-transmitting region 203 in the middle is small, and the widths of the light-transmitting regions 203 at both sides are large.

Moreover, in other exemplary arrangements of the present disclosure, the panel with a virtual curved display surface may further include other components. Therefore, the technical solution with more additional structures is also within the protection scope of the present disclosure.

In the panel with a virtual curved display surface according to the arrangement of the present disclosure, the screen effect of virtual curved surface can be displayed by disposing the grating with respective light-transmitting regions having unequal widths and with respective light-shielding regions having unequal widths at the light-exiting side of the display panel.

Figure 2:
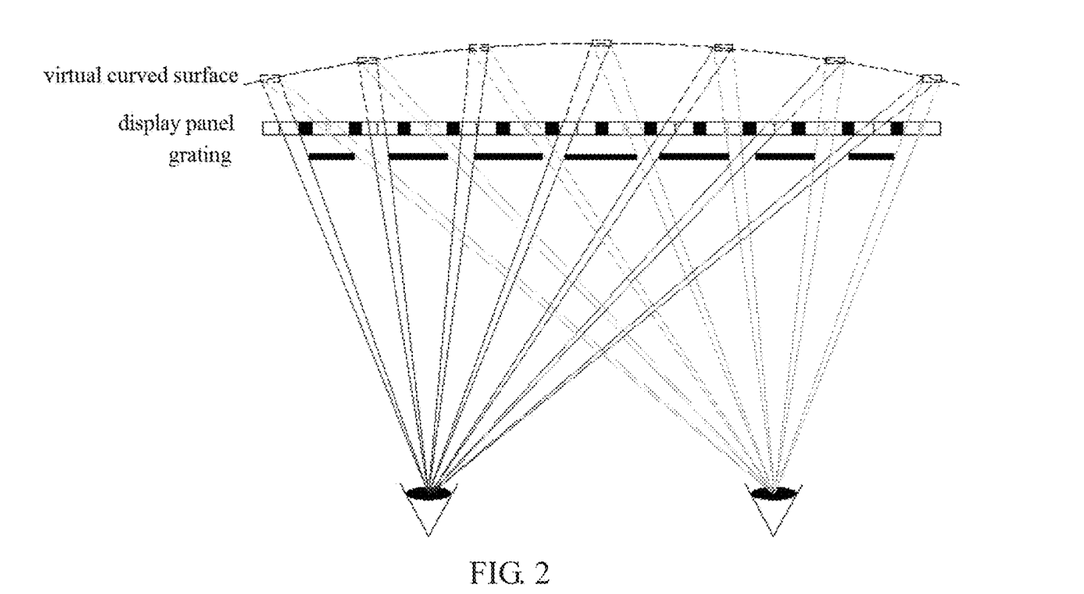
FIG. 2 shows a schematic diagram of a second panel with a virtual curved display surface in an exemplary arrangement of the present disclosure.

FIG. 2 shows a schematic diagram of a second panel with a virtual curved display surface in an exemplary arrangement of the present disclosure.

As shown in FIG. 2, the panel with virtual curved display surface includes a display panel and a grating at the light-exiting side of the display panel, light emitted from the display panel forms a virtual curved surface through the grating, and a plurality of dotted rectangle boxes are arranged on the virtual curved surface in FIG. 2). The structure uses the binocular parallax principle so that the depth perception of both eyes is generated. Specifically, the light-shielding principle of the grating is used to make the light emitted from two adjacent sub-pixels or two adjacent pixels respectively enter the left eye and the right eye of human eyes, and images generated by the adjacent sub-pixels or pixels for the depth perceptions of both eyes arrange in a curved surface, so that a virtual curved surface display effect as shown in FIG. 2 is generated for the both eyes.

In the arrangement shown in FIG. 2, by designing different grating parameters and the distance from the human eyes to the display panel, the virtual curved surface may be formed at an opposite side of the display panel to the light-exiting side (i.e., the virtual curved surface is at rear side).

Figure 3:
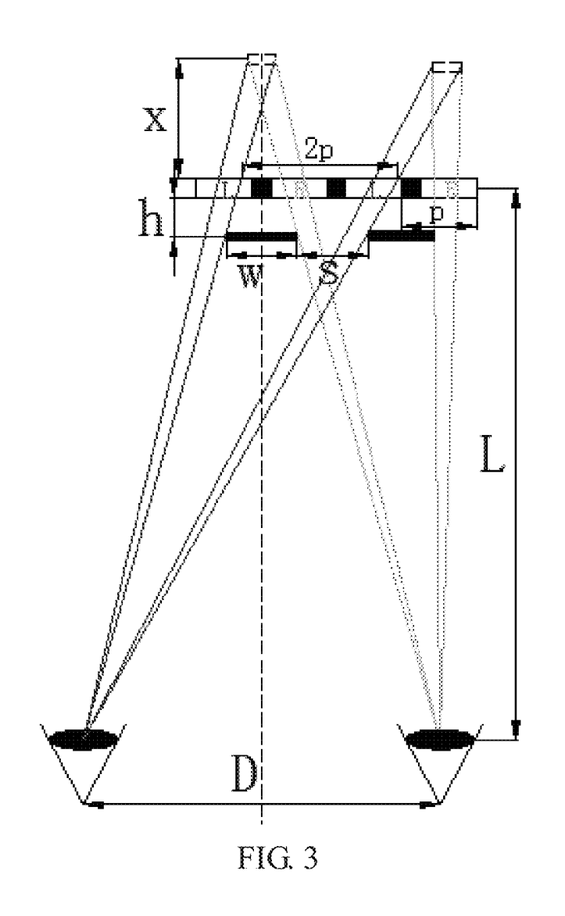
FIG. 3 shows a schematic diagram of a light-shielding region and a light-transmitting region of a grating of the panel with virtual curved display surface shown in FIG. 2.

FIG. 3 shows a schematic diagram of the light-shielding region and the light-transmitting region of the grating of the panel with virtual curved display surface shown in FIG. 2.

The design principle of the grating structure is shown in FIG. 3. It is set that x is a distance between the virtual curved surface and the display panel; w is the width of the light-shielding region; h is a distance between the grating and the display panel; D is an interval between pupils of left and right eyes of a user; L is a distance from the left and right eyes of the user to the display panel; s is the width of the light-transmitting region; and p is a width of a sub-pixel or pixel of the display panel.

It is obtained by geometric relationship that:

$$\frac{w}{D} = \frac{x+h}{x+L} \quad (1)$$

$$\frac{w+s}{2p} = \frac{L-h}{L} \quad (2)$$

According to the above formulas (1) and (2), the calculation formula of the width of each light-shielding region can be obtained as follows:

$$w = \frac{x+h}{x+L}D \quad (3)$$

And the calculation formula of the width of each light-transmitting region is obtained as follows:

$$s = \frac{2(L-h)p}{L} - w \quad (4)$$

In the above formulas, x is a variable whose value is gradually decreased as a distance to the symmetry axis of the display panel is increased, that is, the value of x is large in the middle and small at both sides. It can be seen from the above formulas (3) and (4) that w increases as x increases, and s decreases as x increases. Therefore, the value of w of each of the light-shielding regions of the grating designed in FIG. 2 is large in the middle and small at both sides, and the value of s of each of the light-transmitting regions of the grating is small in the middle and large at both sides.

Figure 4:
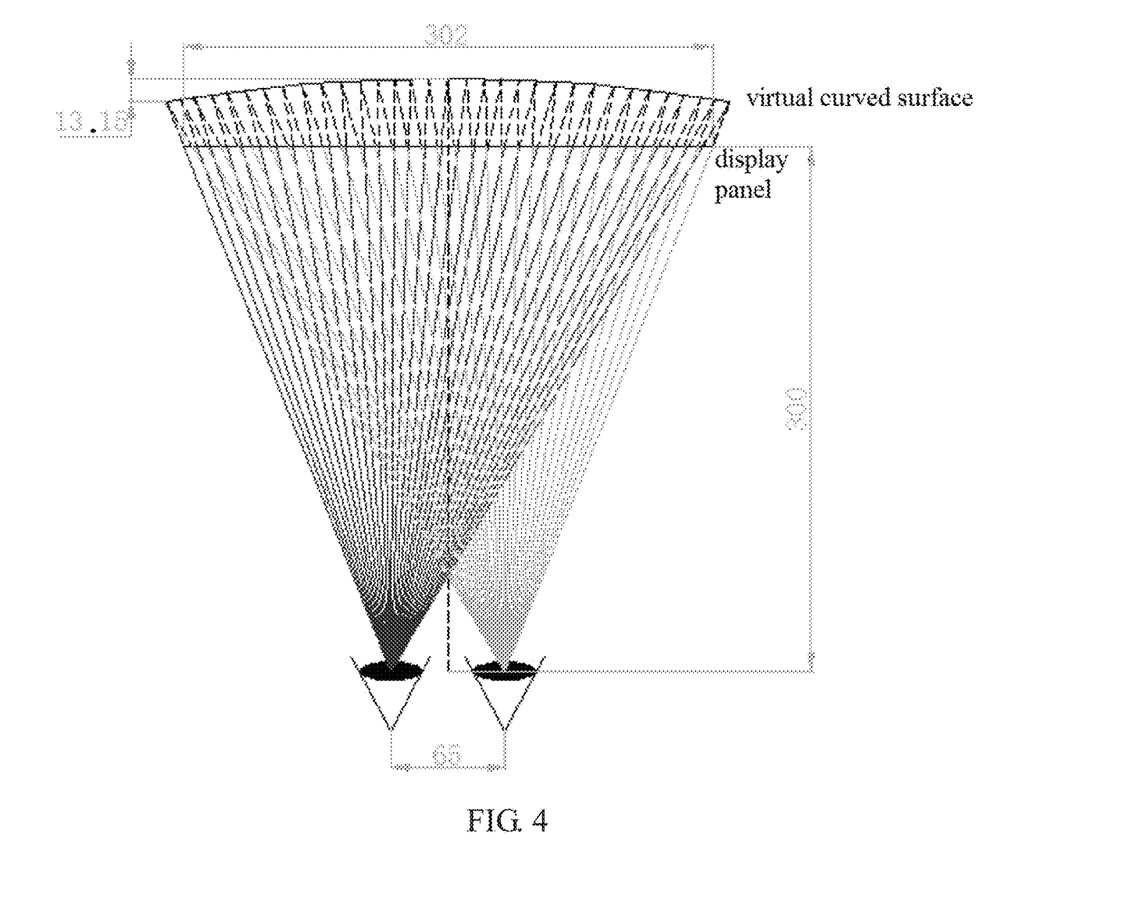
FIG. 4 shows a schematic diagram of a third panel with a virtual curved display surface in an exemplary arrangement of the present disclosure.

FIG. 4 is a schematic diagram of the optical path with true scale of the virtual curved surface at rear side in FIG. 2, which shows the optical path of a 13.3-inch product with true scale. The radius of the obtained virtual curved surface is 1 m, the distance between the two ends of the virtual curved surface and the top point of the arc is 13.15 mm, the distance between the pupils of the left eye and the right eye of human is 65 mm, and the distance from the human eye to the display panel is 300 mm and the width of the display panel is 302 mm.

As shown in FIG. 4, the two ends of the virtual curved surface do not intersect with the display panel.

Figure 5:
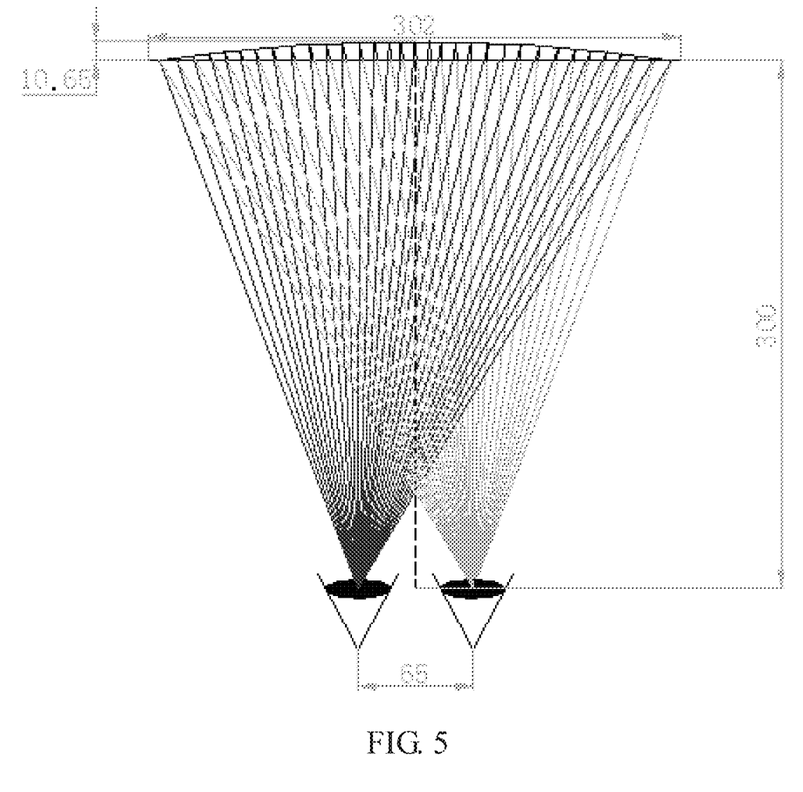
FIG. 5 shows a schematic diagram of a fourth panel with a virtual curved display surface in an exemplary arrangement of the present disclosure.

FIG. 5 is a schematic diagram of the optical path with true scale of the virtual curved surface at rear side in FIG. 2, which shows the optical path of a 13.3-inch product with true scale. The radius of the obtained virtual curved surface is 1 m, the distance between the two ends of the virtual curved surface and the top point of the arc is 10.65 mm, the distance between the pupils of the left eye and the right eye of human is 65 mm, and the distance from the human eye to the display panel is 300 mm and the width of the display panel is 302 mm.

As shown in FIG. 5, both ends of the virtual curved surface intersect with the display panel.

Figure 6:
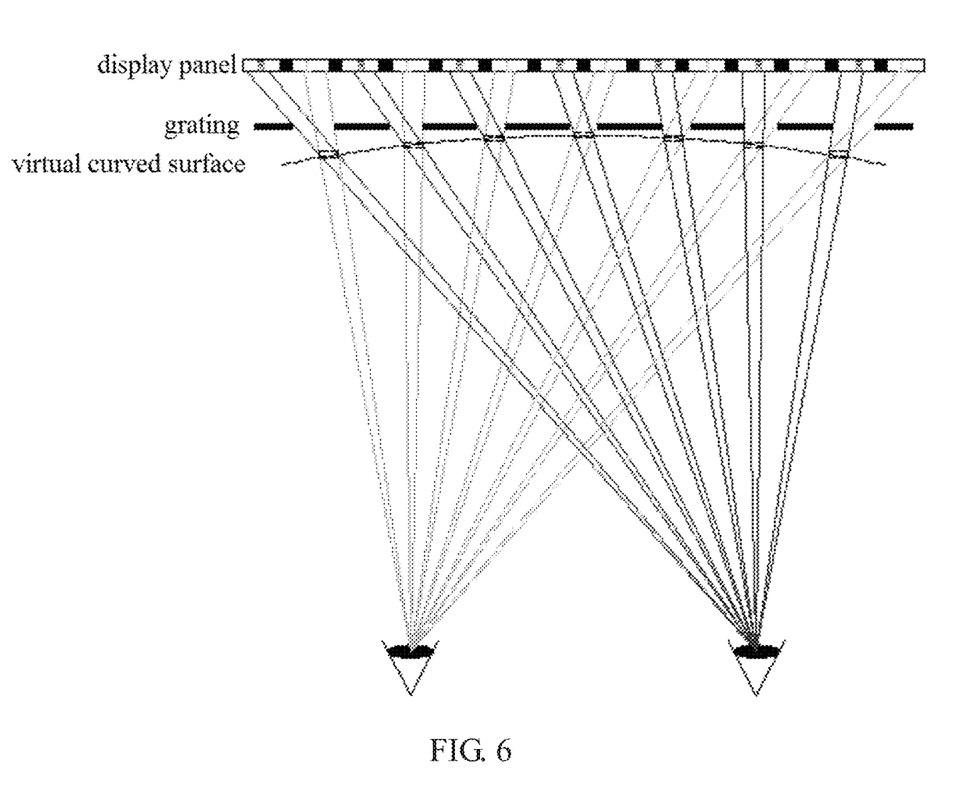
FIG. 6 shows a schematic diagram of a fifth panel with a virtual curved display surface in an exemplary arrangement of the present disclosure.

FIG. 6 shows a schematic diagram of a fifth panel with virtual curved display surface in an exemplary arrangement of the present disclosure.

As shown in FIG. 6, the light emitted from the display panel forms a virtual curved surface through the grating.

In the arrangement shown in FIG. 6, the virtual curved surface is formed at the light-exiting side of the display panel (i.e., the virtual curved surface is at front side) by designing different grating parameters and distance from the human eye to the display panel.

Figure 7:
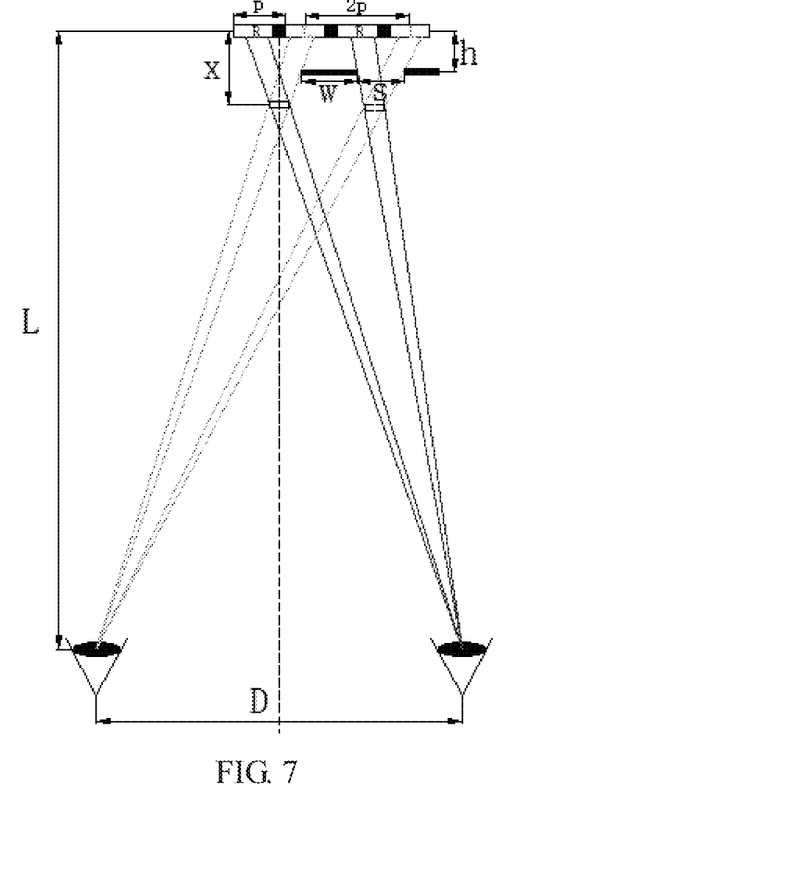
FIG. 7 shows a schematic diagram of a light-shielding region and a light-transmitting region of a grating of the panel with virtual curved display surface shown in FIG. 6.

FIG. 7 shows a schematic diagram of the light-shielding region and the light-transmitting region of the grating of the panel with virtual curved display surface shown in FIG. 6

The design principle of the grating structure is shown in FIG. 7. It is set that x is a distance between the virtual curved surface and the display panel; w is the width of the light-shielding region; h is a distance between the grating and the display panel; D is an interval between pupils of left and right eyes of a user; L is a distance from the left and right eyes of the user to the display panel; s is the width of the light-transmitting region; and p is a width of a sub-pixel or pixel of the display panel.

It is obtained by geometric relationship:

$$\frac{s}{D} = \frac{x-h}{L-x} \quad (5)$$

$$\frac{w+s}{2p} = \frac{L-h}{L} \quad (6)$$

According to the above formulas (5) and (6), the calculation formula of the width of each light-transmitting region can be obtained as follows:

$$s = \frac{x-h}{L-x}D \quad (7)$$

And the calculation formula of the width of each light-shielding region is obtained as follows:

$$w = \frac{2(L-h)p}{L} - s \quad (8)$$

In the above formulas, x is a variable whose value is gradually increased as a distance to the symmetry axis of the display panel is increased, that is, the value of x is small in the middle and large at both sides. It can be seen from the above formulas (7) and (8) that s increases as x increases, and w decreases as x increases. Therefore, the value of w of each of the light-shielding regions of the grating designed in FIG. 6 is large in the middle and small at both sides, and the value of s of each of the light-transmitting regions of the grating is small in the middle and large at both sides.

Figure 8:
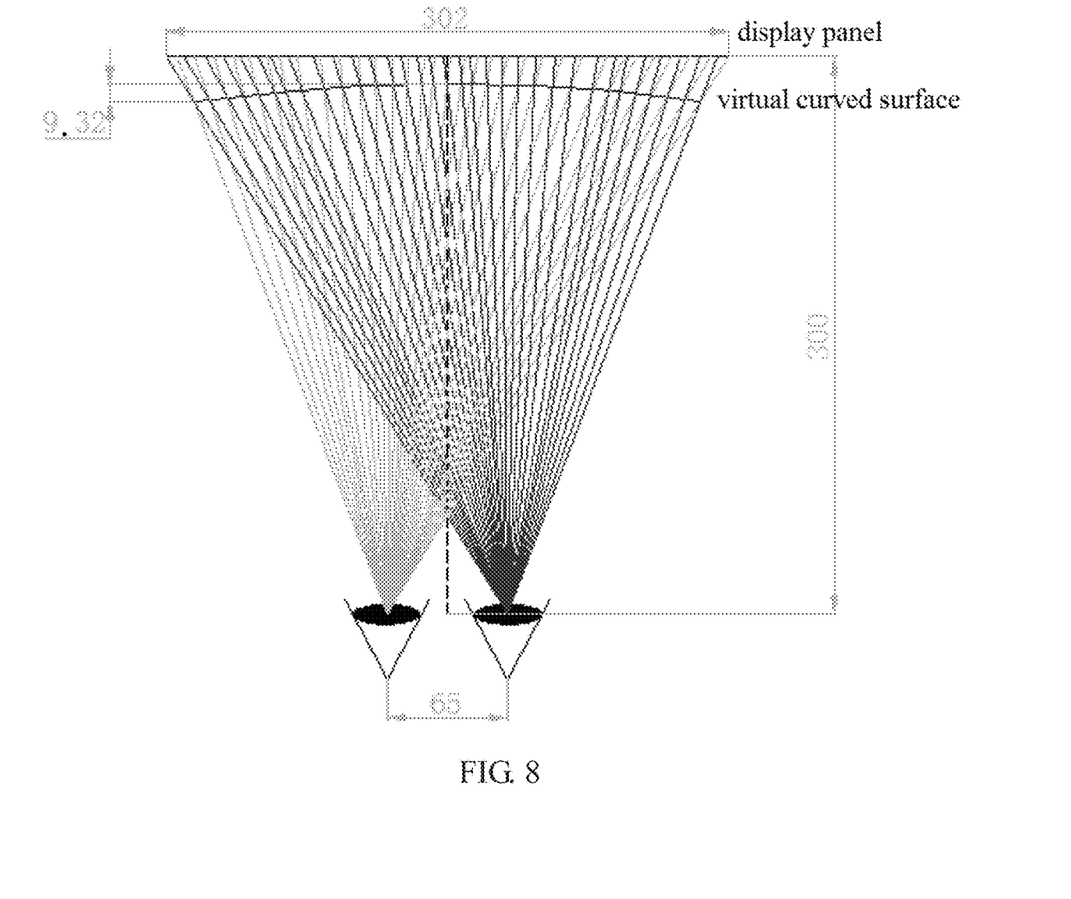
FIG. 8 shows a schematic diagram of a sixth panel with a virtual curved display surface in an exemplary arrangement of the present disclosure.

FIG. 8 shows a schematic diagram of a sixth panel with virtual curved display surface in an exemplary arrangement of the present disclosure.

FIG. 8 is a schematic diagram of the optical path with true scale of the virtual curved surface at front side in the above FIG. 6, which shows the optical path of a 13.3-inch product with true scale. The radius of the obtained virtual curved surface is 1 m, the distance between the two ends of the virtual curved surface and the top point of the arc is 9.32 mm, the distance between the pupils of the left eye and the right eye of human is 65 mm, and the distance from the human eye to the display panel is 300 mm and the width of the display panel is 302 mm.

As shown in FIG. 8, the virtual curved surface is not tangent to the display panel.

Figure 9:
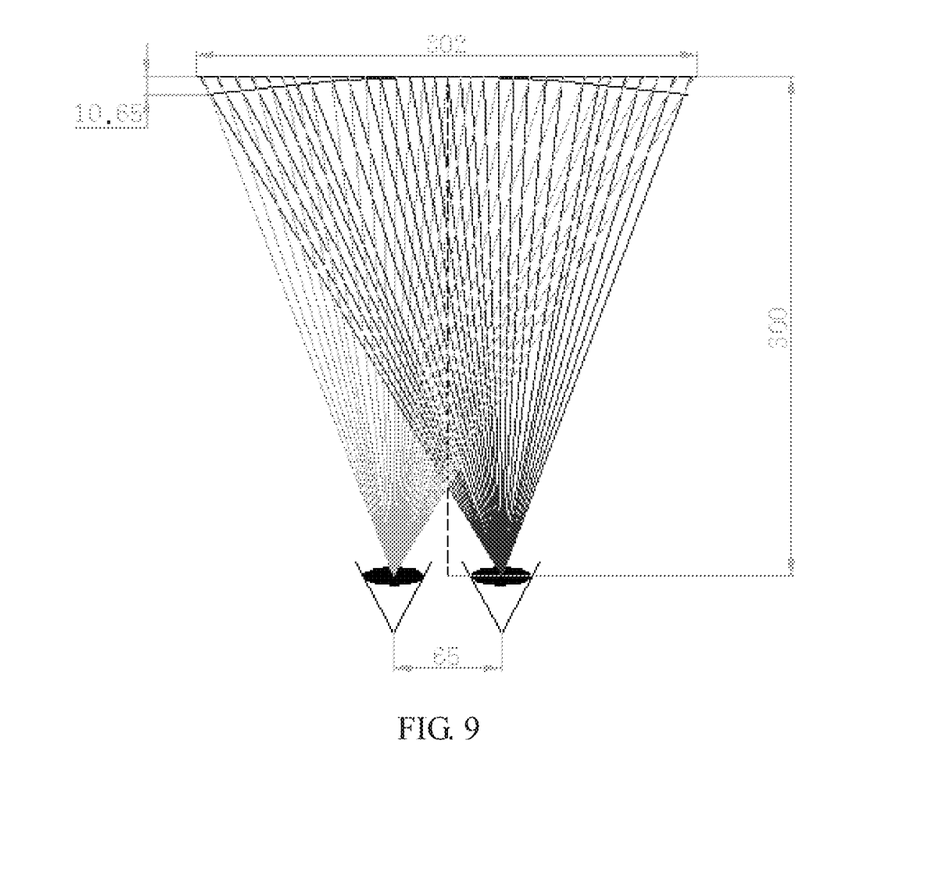
FIG. 9 shows a schematic diagram of a seventh panel with a virtual curved display surface in an exemplary arrangement of the present disclosure.

FIG. 9 shows a schematic diagram of a seventh panel with virtual curved display surface in an exemplary arrangement of the present disclosure.

FIG. 9 is a schematic diagram of the optical path with true scale of the virtual curved surface at front side in above FIG. 6, which shows the optical path of a 13.3-inch product with true scale. The radius of the obtained virtual curved surface is 1 m, the distance between the two ends of the virtual curved surface and the top point of the arc is 10.65 mm, the distance between the pupils of the left eye and the right eye of human is 65 mm, and the distance from the human eye to the display panel is 300 mm and the width of the display panel is 302 mm.

As shown in FIG. 9, the virtual curved surface is tangent to the display panel.

Figure 10:
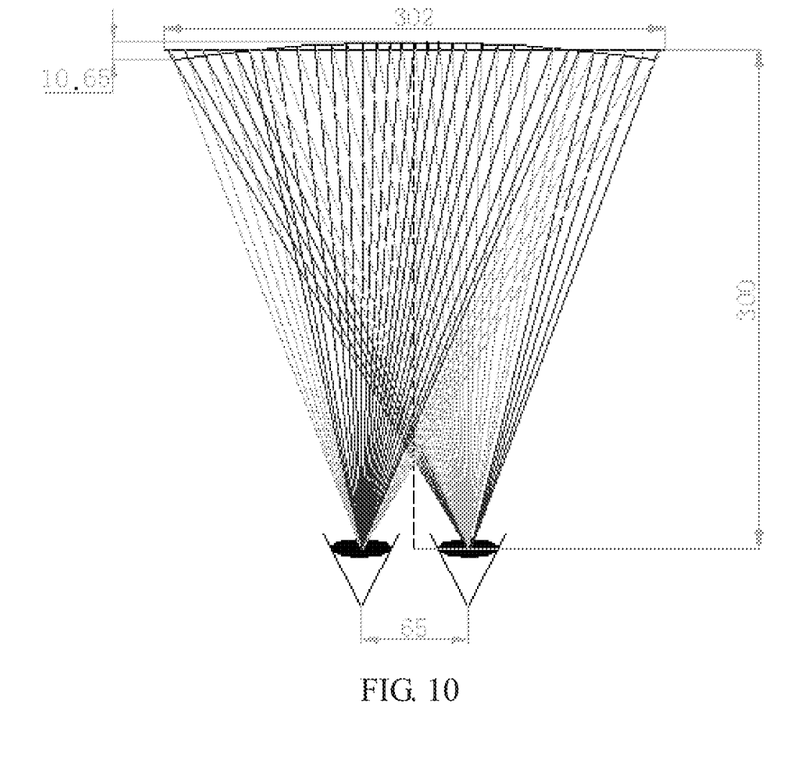
FIG. 10 shows a schematic diagram of an eighth panel with a virtual curved display surface in an exemplary arrangement of the present disclosure.

FIG. 10 shows a schematic diagram of an eighth panel with virtual curved display surface in an exemplary arrangement of the present disclosure.

As shown in FIG. 10, the light emitted from the display panel forms a virtual curved surface through the grating. The optical path of a 13.3-inch product with true scale is shown. The radius of the obtained virtual curved surface is 1 m, the distance between the two ends of the virtual curved surface and the top point of the arc is 10.65 mm, the distance between the pupils of the left eye and the right eye of human is 65 mm, and the distance from the human eye to the display panel is 300 mm and the width of the display panel is 302 mm.

In the arrangement shown in FIG. 10, a portion of the virtual curved surface is located at the light-emitting side of the display panel, and another portion is located at an opposite side of the display panel to the light-emitting side.

The panel with virtual curved display surface provided by the arrangements of the present disclosure can realize the display effect of the virtual curved surface by the flat display panel. The effect of the virtual curved surface is displayed on the flat panel display. On the one hand, the flat display panel can be used to obtain the surrounding effect of the curved display panel, and the visual effect impact of the viewing can be enhanced. On the other hand, there is no need to adopt the curved display panel, therefore the disadvantages of the difficulty physical bending process and heavy device of the curved display panel in the prior art can be overcome. The advantage of saving physical space of the traditional flat display panel is used, and at the same time, it overcomes the disadvantages that as distances from both side edges of the flat panel display to the symmetry axis thereof are increased, corresponding watching distances of the user are increased and light intensity is weakened gradually.

Figure 11:
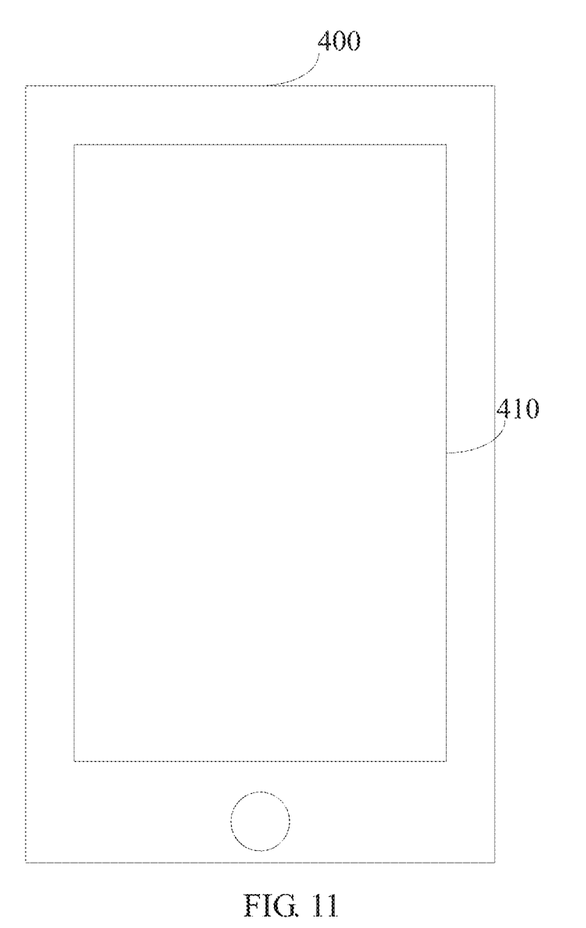
FIG. 11 shows a schematic diagram of a display device in an exemplary arrangement of the present disclosure.

FIG. 11 shows a schematic diagram of a display device in an exemplary arrangement of the present disclosure.

As shown in FIG. 11, an arrangement of the present disclosure further provides a display device 400, including the panel with virtual curved display surface as described in the above arrangements.

The display device 400 may be any product or component having display function such as a display panel, a mobile phone, a tablet computer, a television, a notebook computer, a digital photo frame, a navigator, and the like.

Referring to FIG. 11, the display device 400 may further include a display panel 410. The display panel 410 may be a flat display panel, such as a plasma panel, an organic light emitting diode (OLED) panel, or a thin film transistor liquid crystal display (TFT LCD) panel.

Since the display device provided by the present disclosure includes the panel with virtual curved display surface described above, the same technical problem can be solved and the same technical effects can be obtained, which will not be further described herein.

Other arrangements of the present disclosure will be readily apparent to those skilled in the art upon consideration of the specification and practice of the disclosure herein. The present application is intended to cover any variations, uses, or adaptations of the present disclosure, which are in accordance with the general principles of the present disclosure and include common general knowledge or conventional technical means in the art that are not disclosed in the present disclosure. The specification and arrangements are to be only considered as illustrative, the truth scope and spirit of the present disclosure are pointed out by appended claims.

What is claimed is:

1. A panel with a virtual curved display surface comprising a display panel and a grating, wherein:
    the grating is disposed at a light-exiting side of the display panel, and comprises a plurality of light-transmitting regions and a plurality of light-shielding regions spaced apart from each other;
    respective widths of the plurality of light-shielding regions of the grating are gradually decreased as respective distances from the plurality of light-shielding regions to a symmetry axis of the display panel are increased;
    respective widths of the plurality of light-transmitting regions are gradually increased as respective distances from the plurality of light-transmitting regions to the symmetry axis of the display panel are increased;

light emitted from the display panel forms a virtual curved surface through the grating, and the virtual curved surface is formed at an opposite side of the display panel to the light-exiting side or at the light-exiting side of the display panel;

when the virtual curved surface is formed at the opposite side of the display panel to the light-exiting side, a formula used to calculate the respective width of each of the light-shielding regions is:

$$w = \frac{x+h}{x+L}D;$$

and a formula used to calculate the respective width of each of the light-transmitting regions is:

$$s = \frac{2(L-h)p}{L} - w,$$

when the virtual curved surface is formed at the light-exiting side of the display panel, a formula used to calculate the respective width of each of the light-transmitting regions is:

$$s = \frac{x-h}{L-x}D;$$

and a formula used to calculate the respective width of each of the light-shielding regions is:

$$w = \frac{2(L-h)p}{L} - s,$$

x is a distance between the virtual curved surface and the display panel, and is a variable; w is the width of the light-shielding region; h is a distance between the grating and the display panel; D is an interval between pupils of left and right eyes of a user; L is a distance from the left and right eyes of the user to the display panel; s is the width of the light-transmitting region; and p is a width of one of a sub-pixel and a pixel of the display panel; and when the virtual curved surface is formed at the opposite side of the display panel to the light-exiting side, x gradually decreases as a distance to the symmetry axis of the display panel is increased; and when the virtual curved surface is formed at the light-exiting side of the display panel, x gradually increases as a distance to the symmetry axis of the display panel is increased.

2. The panel with a virtual curved display surface according to claim 1, wherein, when the virtual curved surface is formed at the opposite side of the display panel to the light-exiting side, both ends of the virtual curved surface intersect with the display panel.

3. The panel with a virtual curved display surface according to claim 1, wherein, when the virtual curved surface is formed at the opposite side of the display panel to the light-exiting side, both ends of the virtual curved surface do not intersect with the display panel.

4. The panel with a virtual curved display surface according to claim 1, wherein, when the virtual curved surface is formed at the light-exiting side of the display panel, the virtual curved surface is tangent to the display panel.

5. The panel with a virtual curved display surface according to claim 1, wherein the symmetry axis extends in a first direction from an upper side to a lower side of the display panel.

6. A display device comprising a panel with a virtual curved display surface, wherein:

the panel with the virtual curved display surface comprises a display panel and a grating;

the grating is disposed at a light-exiting side of the display panel, and comprises a plurality of light-transmitting regions and a plurality of light-shielding regions spaced apart from each other;

respective widths of the plurality of light-shielding regions of the grating are gradually decreased as respective distances from the plurality of light-shielding regions to a symmetry axis of the display panel are increased;

respective widths of the plurality of light-transmitting regions are gradually increased as respective distances from the plurality of light-transmitting regions to the symmetry axis of the display panel are increased;

light emitted from the display panel forms a virtual curved surface through the grating, and the virtual curved surface is formed at an opposite side of the display panel to the light-exiting side or at the light-exiting side of the display panel;

when the virtual curved surface is formed at the opposite side of the display panel to the light-exiting side, a formula used to calculate the respective width of each of the light-shielding regions is:

$$w = \frac{x+h}{x+L}D;$$

and a formula used to calculate the respective width of each of the light-transmitting regions is:

$$s = \frac{2(L-h)p}{L} - w,$$

when the virtual curved surface is formed at the light-exiting side of the display panel, a formula used to calculate the respective width of each of the light-transmitting regions is:

$$s = \frac{x-h}{L-x}D;$$

and a formula used to calculate the respective width of each of the light-shielding regions is:

$$w = \frac{2(L-h)p}{L} - s,$$

x is a distance between the virtual curved surface and the display panel, and is a variable; w is the width of the light-shielding region; h is a distance between the grating and the display panel; D is an interval between pupils of left and right eyes of a user; L is a distance from the left and right eyes of the user to the display panel; s is the width of the light-transmitting region; and p is a width of one of a sub-pixel and a pixel of the display panel; and when the virtual curved surface is formed at the opposite side of the display panel to the light-exiting side, x gradually decreases as a distance to the symmetry axis of the display panel is increased; and when the virtual curved surface is formed at the light-exiting side of the display panel, x gradually increases as a distance to the symmetry axis of the display panel is increased.

7. The display device according to claim 6, wherein when the virtual curved surface is formed at the opposite side of the display panel to the light-exiting side, both ends of the virtual curved surface intersect with the display panel.

8. The display device according to claim 6, wherein when the virtual curved surface is formed at the opposite side of the display panel to the light-exiting side, both ends of the virtual curved surface do not intersect with the display panel.

9. The display device according to claim 6, wherein when the virtual curved surface is formed at the light-exiting side of the display panel, the virtual curved surface is tangent to the display panel.

10. The display device according to claim 6, wherein the symmetry axis extends in a first direction from an upper side to a lower side of the display panel.

\* \* \* \* \*